United States Patent Office 2,743,900
Patented May 1, 1956

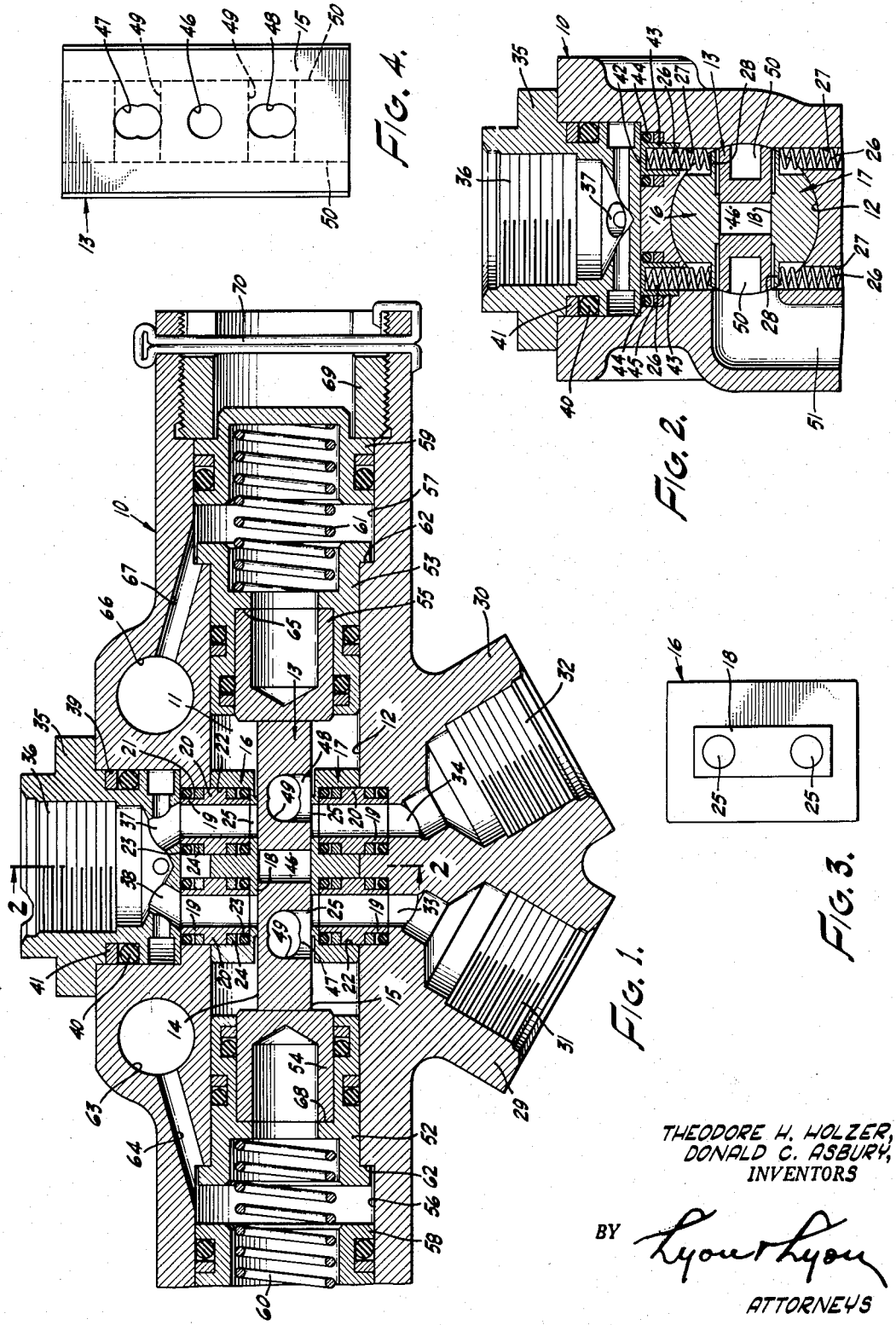

2,743,900
SLIDE VALVE

Theodore H. Holzer and Donald C. Asbury, Glendale, Calif., assignors, by mesne assignments, to The Parker Appliance Company, Cleveland, Ohio, a corporation of Ohio Application November 28, 1952, Serial No. 322,861

2 Claims. (Cl. 251—174)

This invention relates to slide valves and is particularly directed to an improved form of selector valve employing a sliding valve element. This invention relates to improvements over the form of slide valve shown in the Holzer Patent No. 2,601,990 granted July 1, 1952.

The principal object of this invention is to provide improved sealing action between a stationary ported housing and a movable ported slide plate therein. Another object is to provide a valve device of this type including a body having a cavity therein for reception of seal elements adapted to engage opposite sealing faces of the slide plate, together with sealing tubes which connect the body passages to the seal elements and function as key means to retain the seal elements in position.

Other and more detailed objects and advantages will appear hereinafter.

In the drawings:

Figure 1 is a longitudinal sectional view partly broken away showing a preferred embodiment of our invention.

Figure 2 is a transverse sectional view partly broken away taken substantially on the lines 2—2 as shown in Figure 1.

Figure 3 is a plan view of one of the sealing shoes.

Figure 4 is a plan view of one of the faces of side plate.

Referring to the drawings, the slide valve assembly includes a body or housing 10 having a central opening 11, extending therethrough. This opening includes the central cylindrical bore 12 which receives the slide plate 13. This plate has opposed parallel sealing surfaces 14 and 15 which are ground and lapped. A pair of duplicate sealing shoes 16 and 17 are also positioned within the cylindrical bore 12 and each is provided with a central raised surface 18 which is flat. This surface 18 is ground and lapped to form a seal with one of the plate surfaces 14 or 15. Each shoe is fixed within the cylindrical bore 12 by means of a pair of connecting tubes 19. Each of these tubes 19 is provided with an external flange 20 which extends into a body bore 21 and an aligned bore 22 in the shoe. Sealing means are provided at the opposed ends of each tube for sealing the tube with respect to the body 10 and to the shoe. As shown in the drawings, the sealing means in each case includes a synthetic rubber O ring 23 and a back-up packing ring 24 both encircling a projecting portion of the tube. The central opening in each tube is aligned with a port 25 which extends to the sealing surface 18 of the shoe.

Means are provided for maintaining the sealing surfaces 18 of the shoes 16 and 17 in pressure engagement with the surfaces 14 and 15 on the slide plate 13. As shown in Figure 2 of the drawings this means includes a plurality of coil springs 26 each mounted within a bore 27 in the body 10 and engaging a shoulder 28 provided on the shoe. The springs 26 are symmetrically positioned on opposite sides of the sealing surface 18. Each of the shoes 16 and 17 is therefore resiliently urged into sealing engagement with the slide plate 13.

A pair of bosses 29 and 30 are formed integrally on the body 10 and provided with threaded sockets 31 and 32 respectively. These sockets communicate via passages 33 and 34 with two of the tubes 19. For manufacturing and assembly reasons, the boss 35 is formed as a separate part but functions as an integral part of body 10 for assembly therewith. The boss 35 is provided with a threaded socket 36 which communicates via passages 37 and 38 with two of the tubes 19. The boss extends into a transverse bore 39 in the body and is sealed against leakage by means of a synthetic rubber O ring 40 and a back-up packing ring 41. Means (not shown) are provided for securing the boss 35 in position on the body 10. A hollow plug 43 encircles each of the springs and abuts the shoulder 42 provided by the lower surface of the boss 35. The plugs are fixed on the body 10. Each of the plugs 43 is sealed with respect to the body by means of a synthetic rubber O ring 44 and a back-up packing ring 45.

The slide plate 13 is provided with a central port 46 extending therethrough, and two lateral ports 47 and 48 each communicate with the surface 15. These ports 47 and 48 are each connected by passages 49 to the parallel slots 50 provided in the plate member 13 (Figure 4). The slots 50 communicate with the body passage 51 which leads to an internally threaded boss, not shown.

The pressure supply line is connected to the threaded socket 36 and suitable hydraulic lines are connected to the threaded sockets 31 and 32 leading to separate cylinders. A return line, not shown, is connected to the body passage 51. When the slide plate 13 is in the position shown in Figure 1, fluid pressure exists in the passages 37 and 38 and in the ports 25 of the shoe 16 but flow does not occur because neither of the ports 25 are aligned with the port 46. The body passages 33 and 34 are in communication with the return passage 51 through the ports 47, 48, 49 and slots 50. When the slide plate 13 is shifted to the left as viewed in Figure 1 to bring the port 46 in alignment with the left-hand ports 25 in both shoes 16 and 17, fluid under pressure passes through the passage 38 into the body passage 33. The passage 34 is then still connected to the return line 51 through the port 48, passage 49 and slot 50. Similarly when the slide plate 13 is shifted to the right, as viewed in Figure 1, to bring the port 46 into alignment with the right-hand ports 25 in both of the shoes 16 and 17 fluid under pressure passes through passage 37 and into passage 34. The passage 33 is connected to the return line 51 through the port 47, passage 49 and slot 50. It will be observed that there are no intermediate positions of the slide plate 13 at which hydraulic fluid can find an unintended path of communication between two valve ports.

In the particular structure illustrated in the drawings, the slide valve 13 is shifted by means of fluid under pressure, as shown in the drawings. Piston carriers 52 and 53 are slidably mounted within the cylindrical bore 12 and sealed with respect thereto. Pistons 54 and 55 are each slidably mounted coaxially to the carriers and sealed with respect thereto. The pistons 54 and 55 abut the opposed ends of the slide valve 13. Counterbores 56 and 57 are provided in the body 10 and plugs 58 and 59 are mounted in these counterbores and sealed against leakage. A compression spring 60 is interposed between the plug 58 and the piston carrier 52. Similarly a compression spring 61 is interposed between plug 59 and piston carrier 53. The springs act to move the piston carriers inwardly and to bring abutting shoulders 62 into contact. When fluid under pressure is admitted to the body opening 63 it passes through passage 64 into the counterbore 56 to act on the piston 54. The piston 54 moves to the right as viewed in Figure 1 and moves the valve plate 13 to align the port 46 with the right-hand ports 25 in the shoes 16 and 17. The piston 55 abuts the shoulder 65 on the carrier 53 and consequently the carrier 53 and piston 55 move to the right as a unit against the action of the spring 61. The motion is arrested when the piston carrier 53 engages the plug 59.

Similarly when the fluid under pressure is admitted into the body opening 66 it passes through passage 67 in the counterbore 57. This pressure acts on the piston 55 to move it to the left and to shift the valve plate 13 to bring the central port 46 into alignment with the left-hand ports 25 in the shoes 16 and 17. The piston 54 engages the shoulder 68 on the carrier 52 and consequently the carrier 52 and piston 54 move to the left as a unit against the action of the spring 60. The motion is arrested when the piston carrier 52 engages the plug 58.

The means for introducing fluid under pressure into either of the body openings 63 or 66 and for venting the other body opening are not shown in the drawing since they constitute no part of our present invention.

Any suitable or desirable means may be provided for fixing the plugs 58 and 59 against outward movement under the action of the pressure fluid. As shown in Figure 1, nuts 69 may be threaded into the body 10 at opposite ends of the central passage 11 to engage the plugs 58 and 59. The nuts may be locked in place by means of cotter pins 70.

It will be observed that when neither of the body openings 63 nor 66 is pressurized that the springs 60 and 61 function to move the valve plate 13 to the neutral position shown in Figure 1. Similarly a failure in hydraulic pressure results in returning the valve plate 13 to the neutral position.

Having fully described our invention, it is to be understood that we do not wish to be limited to the details herein set forth, but our invention is of the full scope of the appended claims.

We claim:

1. In a fluid valve, the combination of: a body member having a cylindrical bore therein, a ported slide element extending axially in the bore and having parallel surfaces, the slide element also having curved edge portions engaging the cylindrical bore, a pair of duplicate shoes axially insertable into the cylindrical bore and adapted to be positioned on opposite sides of the slide element, each shoe having a ported face for sealing contact with one of said parallel surfaces on the slide element, each shoe also having a curved surface shaped to conform to said cylindrical bore, the body member and said shoes having aligned transverse openings communicating with said ported surfaces of said shoes, a plurality of tubes, each tube having one end sealed to one of the transverse openings, respectively, in said shoes, a sealing ring encircling each of the tubes to seal it with respect to one of the transverse openings in the body member, respectively, each tube having a central flange fitting into said aligned transverse openings to serve as a key to prevent axial movement of the shoes, and means whereby the slide element may be shifted axially within said cylindrical bore.

2. In a fluid valve, the combination of: a body member having a cylindrical bore therein, a ported slide element extending axially in the bore and having parallel surfaces, the slide element also having curved edge portions engaging the cylindrical bore, a pair of duplicate shoes axially insertable into the cylindrical bore and adapted to be positioned on opposite sides of the slide element, each shoe having a ported face for sealing contact with one of said parallel surfaces on the slide element, each shoe also having a curved surface shaped to conform to said cylindrical bore, the body member and said shoes having aligned transverse openings communicating with said ported surfaces of said shoes, a plurality of tubes, sealing rings encircling each end of the tube to seal it with respect to the body member and to said shoe, respectively, each tube having a central flange fitting into said aligned transverse openings to serve as a key to prevent axial movement of the shoes, and means whereby the slide element may be shifted axially within said cylindrical bore.

References Cited in the file of this patent

UNITED STATES PATENTS

| Number | Name | Date |
| --- | --- | --- |
| 566,501 | Cook | Aug. 25, 1896 |
| 1,942,232 | Alviset | Jan. 2, 1934 |
| 2,394,487 | Rotter | Feb. 5, 1946 |
| 2,601,990 | Holzer | July 1, 1952 |
| 2,664,267 | Ray | Dec. 29, 1953 |
| 2,669,417 | Ray | Feb. 16, 1954 |